Aug. 19, 1930.            W. R. BLUEHDORN            1,773,090
                         MOUNT FOR MACHINE GUNS
                          Filed Nov. 4, 1929         2 Sheets-Sheet 1
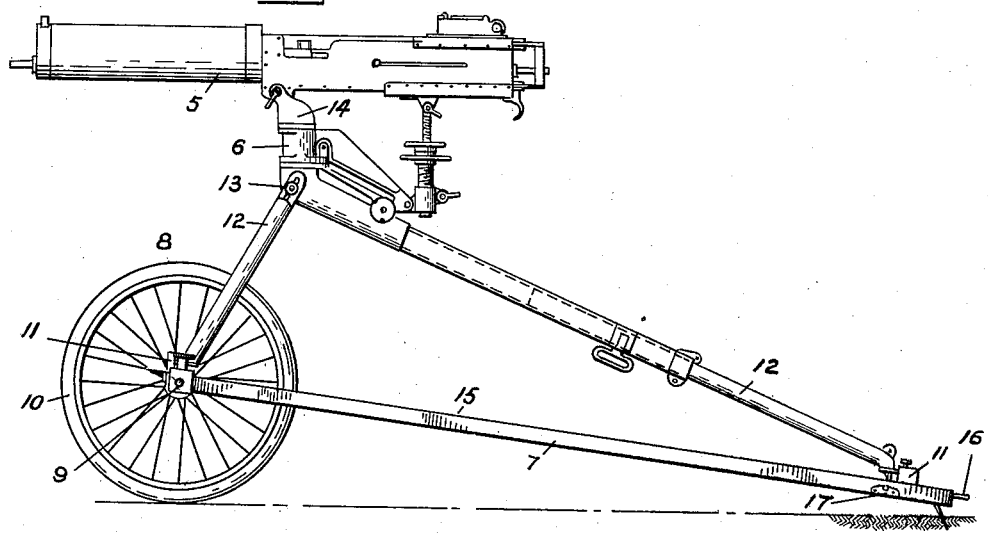
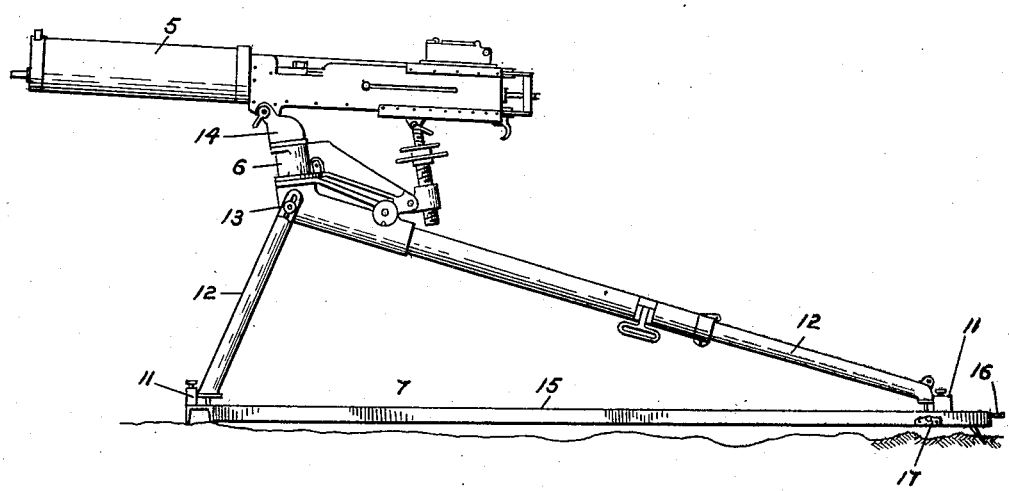
INVENTOR.
Wm. R. Bluehdorn
BY W. N. Roach
ATTORNEY

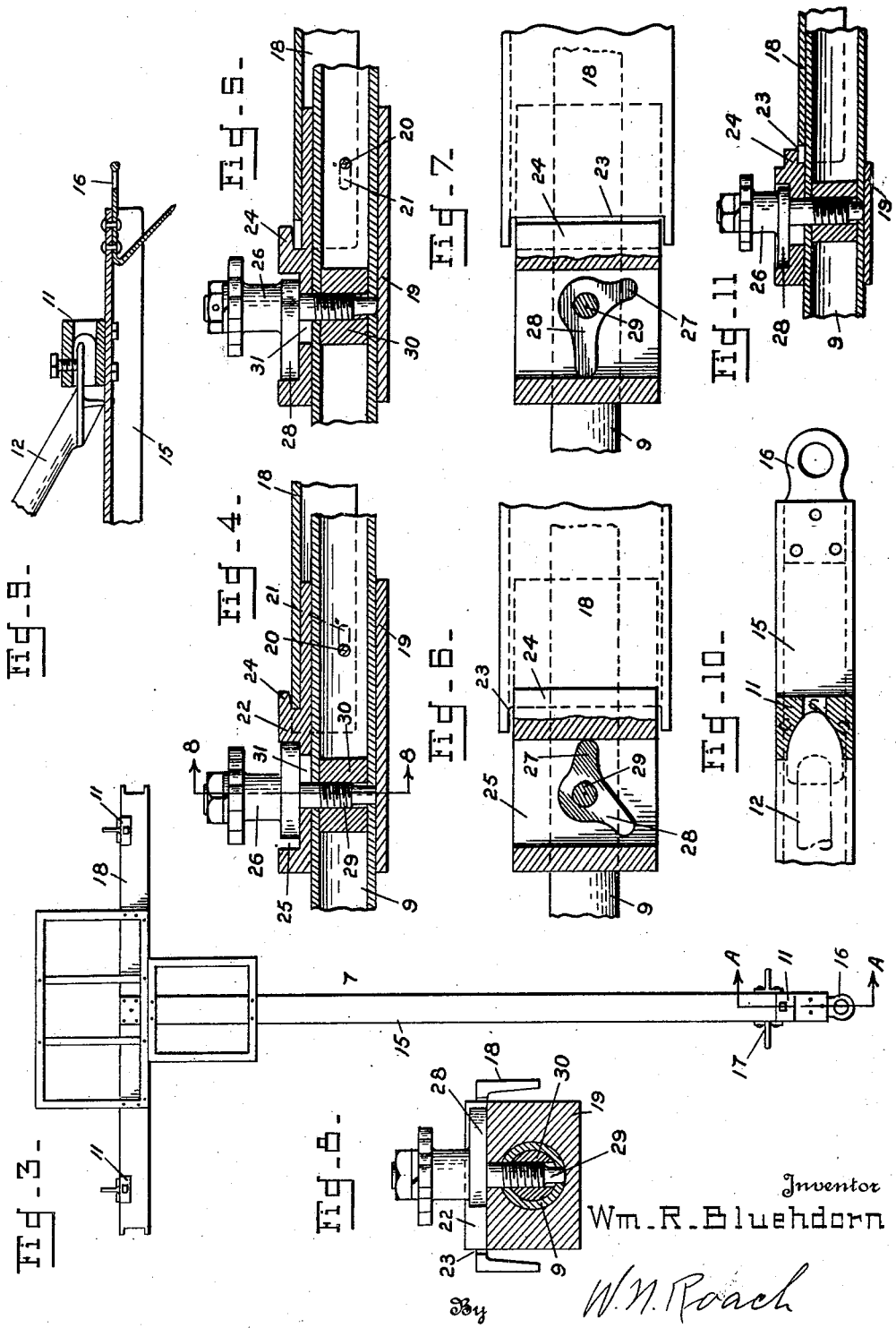

Patented Aug. 19, 1930

1,773,090

UNITED STATES PATENT OFFICE

WILLIAM R. BLUEHDORN, OF HARTFORD, CONNECTICUT

MOUNT FOR MACHINE GUNS

Application filed November 4, 1929. Serial No. 404,744.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The subject of this invention is a mount for machine guns.

Machine guns of small caliber are usually mounted on a tripod for general purpose firing but when the gun is to be employed for the delivery of accurate indirect firing or for firing over the heads of friendly troops it is essential that the stability of the tripod be assured by placing it on an auxiliary base which is in the form of the letter T, each end accommodating one of the legs of the tripod. It has been the general practice, heretofore, in transporting manually or by means of an animal-drawn cart, to form separate loads or components of the gun, tripod and T-base and as a result, it requires appreciable time to prepare the gun for action and to take the gun out of action.

With a view to reducing the time of preparation for action and travel and enabling the guns to be transported in the mounted condition ready to open fire, advantage is taken of the favorable shape of the T-base to have it constitute the frame of a cart and a novel attachment is provided for securing the T-base to a wheeled axle unit.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of the gun and mount in the traveling position;

Fig. 2 is a similar view of the gun and mount in emplaced position;

Fig. 3 is a plan view of the T-base;

Figs. 4 and 5 are detail sectional views through the T-base and axle connection and respectively showing the parts in the locked and unlocked position;

Figs. 6 and 7 are sectional plan views respectively of Figs. 4 and 5;

Fig. 8 is a sectional view on the line 8—8 of Fig. 4;

Fig. 9 is a longitudinal sectional view on the line A—A of Fig. 3;

Fig. 10 is a sectional plan view of Fig. 9; and

Fig. 11 is a fragmentary, sectional view similar to Fig. 5, and showing a modification of the holding sleeve.

In Fig. 1 there is shown a standard machine gun 5 mounted on the regulation tripod 6 which is extended in the accustomed position of firing. The tripod rests on an auxiliary base 7 which is in the form of the letter T and constitutes the frame of a cart when a wheeled axle unit 8 is associated therewith. The axle unit consists of a tubular axle 9 on the ends of which are the usual wheels 10.

The T-base is made of channel bars, preferably of sufficient width to insure ample bearing surface when placed on the ground and pressed therein. On its upper surfaces adjacent the extremities there are provided three stirrups 11 for receiving the respective feet of the tripod legs 12. By operating the adjusting knobs 13, the head 14 of the tripod may be raised or lowered when inserting or removing the feet from the stirrups. In this manner a tripod, when placed in position on the T-base, will be incapable of movement relative thereto.

The leg 15 of the T-base forming the trail of the mount is equipped with a draft coupling 16 for attachment to another vehicle and also with a handle bar 17 which is preferably rigid to permit pushing as well as pulling.

The arms 18 of the T-base, being of channel shape, span the tubular axle 9 and the extremities rest on rectangular sleeves 19 which are slidably mounted on opposite ends of the axle and which are each positioned by a fixed pin 20 carried by the axle and disposed in a slot 21 in the sleeve. The upper face of the sleeve at its outer end includes a raised portion or lug 22 so that when the sleeve is at the extreme inner end of its movement or in locking position, as seen in Fig. 4, the lug is engaged in a recess 23 in the extremity of the web of the arm 18 and thereby restrains the T-base against longitudinal, as well as lateral, displacement. The inner side of the lug 22 is formed into a projecting lip 24 which in the locking position of the sleeve overlies the arm 18 and restrains the T-base against vertical displacement.

The upper face of the lug 22 is provided with a groove 25 transverse to the direction of its movement on the axle. In this groove there is placed an actuating member 26 having two cams 27 and 28, respectively engaging opposite sides of the groove in moving the sleeve inward into engagement with the T-base and moving it outwardly to disengage it from the T-base. The member 26 is rotatable on a fixed pin 29 which is carried by a block 30 stationary in the hollow axle. A slot 31 in the floor of the groove 25 is provided to permit the pin 29 to be secured to the block 30 and this slot further cooperates with the pin in limiting the sliding movement of the sleeve. The latter function is also performed by the positioning pin 20 and the slot 21 in the sleeve.

The T-base is placed over the axle with the sleeves 19 in the outer position, shown in Fig. 5, the cam 28 of the actuating member being in engagement with the outer side of the groove 25. The actuating member is then rotated towards the center of the T-base (counter-clockwise with the left hand member and clockwise with the right hand member) and the cam 27 is brought into play to move the sleeve into the holding position, shown in Fig. 4. When the cam is forced into full engagement axially of the sleeve, it will be bound sufficiently tight to prevent accidental rotation of the actuating member which might be caused when the car is traveling over rough ground.

When the tripod is used independently to meet general tactical requirements, the cart may be employed for bringing up ammunition.

In the modification shown in Fig. 11 the arms of the T-base rest directly on the axle instead of on the sleeves.

I claim:

1. In a gun carriage, a wheeled axle unit, sleeves mounted on opposite ends of the axle for limited sliding movement, a lug whose inner side forms a lip on the outer end of the upper portion of each sleeve, said lug portion having a transverse groove and a slot through the floor of the groove, a pin fixed to the axle and projecting through the slot in the floor of the groove, an actuating member rotatable on the pin and having two cams for respectively engaging the sides of the groove and a T-base formed of channel bars and positionable with its arms resting on the inner ends of the sleeves, the extremity of the arms formed with a recess for receiving the lug of the sleeve.

2. In a gun carriage, a wheeled axle unit, sleeves mounted on opposite ends of the axle for limited sliding movement and having a lug formed with a transverse groove, an actuating member rotatable about a fixed center and disposed in the groove, a pair of cams on the actuating member for respectively engaging the sides of the groove and a T-base formed of channel bars and positionable with its arms resting on the inner ends of the sleeves, the extremity of the arms formed with a recess for receiving the lug of the sleeve.

3. In a gun carriage, a wheeled axle unit, sleeves mounted on opposite ends of the axle for limited sliding movement and having a lug formed with a transverse groove, an actuating member rotatable about a fixed center and disposed in the groove, a pair of cams on the actuating member for respectively engaging the sides of the groove and a T-base having its arms over the axle, the extremity of the arms formed with a recess for receiving the lug of the sleeve.

4. In a gun carriage a wheeled axle unit, a T-base whose arms are positionable over the axle, holding members mounted on the axle for limited sliding movement, the inner ends of said member supporting the arms of the T-base, and cam means for moving the holding members into and out of holding engagement with the arms of the T-base.

5. In a gun carriage a wheeled axle unit, a T-base whose arms are positionable over the axle, holding members mounted on the axle for limited sliding movement, and cam means for moving the holding members into and out of holding engagement with the arms of the T-base.

6. In a gun carriage a wheeled axle unit, a T-base whose arms are positionable over the axle, holding members mounted on the axle for limited sliding movement, and means for moving the holding members into and out of holding engagement with the arms of the T-base.

WILLIAM R. BLUEHDORN.